United States Patent
Jeong et al.

(10) Patent No.: US 6,539,512 B1
(45) Date of Patent: Mar. 25, 2003

(54) INTERLEAVING METHOD AND CIRCUIT FOR HIGH DENSITY RECORDING MEDIUM

(75) Inventors: Jong-sik Jeong, Seoul (KR); Yoon-woo Lee, Suwon (KR); Gyu-hwan Jung, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/366,755

(22) Filed: Aug. 4, 1999

(30) Foreign Application Priority Data

Oct. 30, 1998 (KR) .......................... 98-46240
Aug. 4, 1998 (KR) .......................... 98-31697

(51) Int. Cl.[7] .......................................... H03M 13/00
(52) U.S. Cl. ...................... 714/752; 714/755; 714/761
(58) Field of Search ................... 714/762, 755, 714/756, 701, 761, 784, 752; 360/73.02

(56) References Cited

U.S. PATENT DOCUMENTS

| | | | | | |
|---|---|---|---|---|---|
| 4,429,390 | A | * | 1/1984 | Sonoda et al. | 714/762 |
| 4,441,184 | A | * | 4/1984 | Sonoda et al. | 714/755 |
| 4,586,093 | A | * | 4/1986 | Fukuju et al. | 360/73.02 |
| 4,598,403 | A | * | 7/1986 | Odaka | 714/756 |
| 4,852,101 | A | * | 7/1989 | Kobayashi et al. | 714/756 |
| 5,732,088 | A | * | 3/1998 | Sako | 714/701 |
| 5,790,570 | A | * | 8/1998 | Heegard et al. | 714/755 |
| 6,216,245 | B1 | * | 4/2001 | Noda | 714/755 |

FOREIGN PATENT DOCUMENTS

| | | |
|---|---|---|
| JP | 57-85149 | 5/1982 |
| JP | 2-40170 | 2/1990 |
| JP | 5-62362 | 3/1993 |
| JP | 7-307065 | 11/1995 |
| JP | 8-221972 | 8/1996 |
| JP | 9-213012 | 8/1997 |
| JP | 10-188489 | 7/1998 |
| WO | WO 97/01841 | 1/1997 |

* cited by examiner

*Primary Examiner*—David Ton
(74) *Attorney, Agent, or Firm*—Staas & Halsey LLP

(57) ABSTRACT

An interleaving method for a high density recording medium and an interleaving circuit therefor. In this circuit, an intrablock interleaver interleaves received data having a predetermined error correction code within an error correction block to output intrablock-interleaved data. An interblock interleaver interleaves the intrablock-interleaved data between the error correction blocks in units of a predetermined number of the error correction blocks to output interblock-interleaved data. Accordingly, the capability of correcting a burst error due to a scratch on a disc is improved while maintaining compatibility with a general DVD format in an error correction format. Also, each row having position information is not interleaved while interblock interleaving is performed, so that a similar access time to the access time in a DVD is achieved. Therefore, high-speed searching is possible.

35 Claims, 10 Drawing Sheets

INTERLEAVING METHOD AND CIRCUIT FOR HIGH DENSITY RECORDING MEDIUM

CROSS-REFERENCE TO RELATED APPLICATIONS

This application claims the benefit of Korean Application Nos. 98-31697, filed Aug. 4, 1998 and 98-46240, filed Oct. 30, 1998, in the Korean Patent Office, the disclosures of which are incorporated herein by reference.

BACKGROUND OF THE INVENTION

1. Field of the Invention

The present invention relates to the field of error correction, and more particularly, to an interleaving method and circuit which can be applied to a high density recording medium having a high definition digital versatile disc (HD-DVD) format and by which high-speed searching can be achieved.

2. Description of the Related Art

There is a recent trend toward an increase in the capacity of data recordable on an optical disc. This trend allows storage of various information in order to record and reproduce a corresponding large amount of data to provide good picture quality and excellent sound quality, and in order to play a sufficient role as a peripheral apparatus of a computer.

To do this, an optical disc has a storage capacity of about 4.7 Gbyte due to the development of an initial compact disc (CD) having a storage capacity of about 600 Mbyte into a DVD-format disc (DVD). The storage capacity of about 4.7 Gbyte allows reproduction of about 135 minutes of data with a picture quality of the Moving Picture Expert Group (MPEG)-2 and a sound quality of audio coding (AC)-3.

However, recent trends are demanding the industrialization of high definition televisions (HDTVs) and a picture quality of a HDTV level. Thus, a recording medium having a storage capacity for a greater amount of data is required to meet the demand for HDTV-level picture quality. An HD-DVD format disc (HD-DVD) has been developed to achieve the above-described demand.

Storage of about 15 Gbyte data increased by approximately 3.28 times from the about 4.7 Gbyte of data capable of being stored in a general DVD must be enabled to continuously reproduce pictures and sounds having levels corresponding to the picture quality and sound quality of HDTVs for about 130 minutes. The HD-DVD allows an increase in the capacity of data recorded on a disc having a size such as that of a DVD-ROM (read only memory) by reducing the actual lengths of a recorded bits.

However, in this case, the number of errors generated upon detection of data in a pickup unit of an optical recording and reproducing apparatus is increased, and the size of data loss due to generation of a small scratch on a disc is much larger as compared to the general DVD. This data loss can be compensated for by an error correction technique which has a great effect on the amount of user recorded data and the reliability of user data upon recording and reproduction, according to how the error correction technique is applied. Therefore, when an error correction method applied to the general DVD is applied to an HD-DVD without change, the reliability of reproduced data is greatly degraded.

A format for an error correction block used in a DVD-ROM, as an example of a DVD, includes 208 rows of 182 bytes as shown in FIG. 1. In the row direction, there are 172 bytes of user data and 10 bytes of inner parity, and in the column direction, there are 16 sectors of 12 bytes and an outer parity of 16 bytes.

This error correction block is interleaved as shown in FIG. 2 to separate adjacent bits from each other and the separated bits are recorded on a disc so that the recorded bits can be error-corrected even when some defects are generated on the disc. That is, 16 bytes of outer parity are arranged such that one byte of outer parity is inserted into the last row of each sector. In this general DVD, only a row-interleaving method is applied in units of an error correction block. This row-interleaving method does not have the error correction capability required by a high density recording medium such as the HD-DVD.

Here, the total error correction block is comprised of 37856 bytes obtained by multiplying 182 bytes by 208 bytes. The range of continuous correctable error in the error correction block is 182 bytes×16 rows since the outer parity is comprised of 16 bytes. In practice, a sync pattern as well as user data and parity are recorded on a disc, so that the sync pattern must be considered upon calculating the error correction capability. Two sync patterns are inserted in a row. That is, a sync pattern of 64 bits exists in a row of 182 bytes by inserting a sync pattern of 32 bits at intervals of 91 bytes.

Hence, a burst error capable of being corrected in an error correction block for a general DVD-format disc is comprised of 2976 bits which is calculated by 32 bits×2+(182 bytes×8)×2 since a row-directional line is comprised of 182 bytes and 8 to 16 modulation on the row-directional line must be considered. A burst error capable of being corrected in the entire error correction block is 47616 bits obtained by multiplying 2976 bits by 16 rows. In the DVD disc, the minimum mark length (3T) is 0.4 $\mu$m which corresponds to 3 channel bits. Thus, if a correctable length is X, the following equations are obtained:

$$0.4\ \mu m{:}3\ \text{bit}=X\ \mu m{:}47616\ \text{bit}$$

$$X=0.000634\ m=6.34\ mm$$

According to the results of the above calculation, the maximum error capable of being corrected in an error correction block for a DVD is comprised of 47616 bits.

In the specification of the DVD, the minimum recordable mark length is 0.4 $\mu$m, and the interval (track pitch) between tracks is 0.74 $\mu$m. Here, as for error correction capability, error correction can be made even with a scratch of about 6.3 mm in the tangential direction of the disc since an outer parity of 16 bytes exists in the column direction.

Accordingly, in the error correction capability required by a general optical disc, a scratch of about 6.3 mm on the disc in the tangential direction must be able to be corrected. The DVD format disc also requires an error correction capability of this level, and sets the number of bits which can be corrected in an error correction block on the basis of this error correction capability.

In a DVD-ROM, error correction for a scratch of 6.3 mm can be made using an error correction block used in the DVD, but the same error correction cannot be made using the error correction block in an HD-DVD. This is because the scratch of about 6.3 mm affects 47616 bits in a DVD-ROM but the same scratch in the HD-DVD affects information of 156180 bits which is about 3.28 times greater than the 47616 bits. Thus, it is impossible to apply an error correction method used for the general DVD to the HD-DVD without change.

SUMMARY OF THE INVENTION

To solve the above problem, it is an object of the present invention to provide an interleaving method for a high density recording medium by which an error correction capability is improved while maintaining compatibility with a DVD format.

It is another object of the present invention to provide an interleaving circuit for a high density recording medium, by which error correction capability can be improved using an error correction code used in a DVD format, and high-speed searching can be made by accessing a desired position in the same amount of time as that for the DVD format.

Additional objects and advantages of the invention will be set forth in part in the description which follows and, in part, will be obvious from the description, or may be learned by practice of the invention.

Accordingly, to achieve the first and other objects of the present invention, there is provided an interleaving method for improving the error correction capability of a high density recording medium, the method comprising the steps of: (a) generating first interleaved data by interleaving received data having a predetermined error correction code within error correction blocks; and (b) generating second interleaved data by interleaving the first interleaved data between the error correction blocks in units of a predetermined number of error correction blocks.

To achieve the second and other objects of the present invention, there is provided an interleaving circuit for improving the error correction capacity of a high density recording medium. In this circuit, an intrablock interleaver interleaves received data having a predetermined error correction code within the error correction blocks to output intrablock-interleaved data. An interblock interleaver interleaves the intrablock-interleaved data between the error correction blocks in units of a predetermined number of the error correction blocks to output interblock-interleaved data.

BRIEF DESCRIPTION OF THE DRAWINGS

The above objects and advantages of the present invention will become more apparent by describing in detail preferred embodiments thereof with reference to the attached drawings, in which.

DESCRIPTION OF THE PREFERRED EMBODIMENTS

Figure 1:
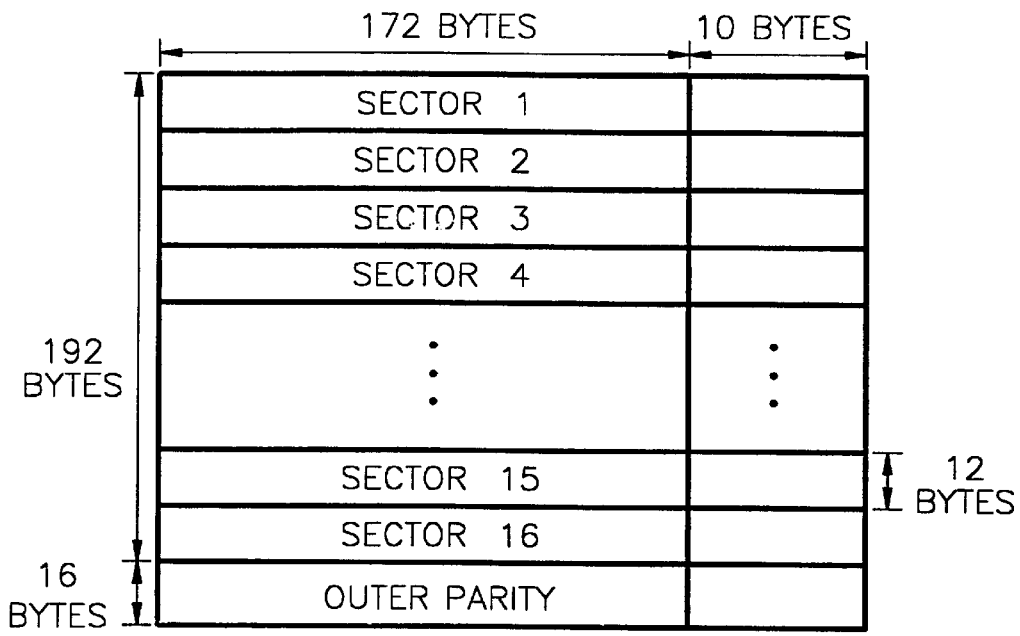
FIG. 1 is a view illustrating the format of an error correction block for a general DVD.
Figure 2:
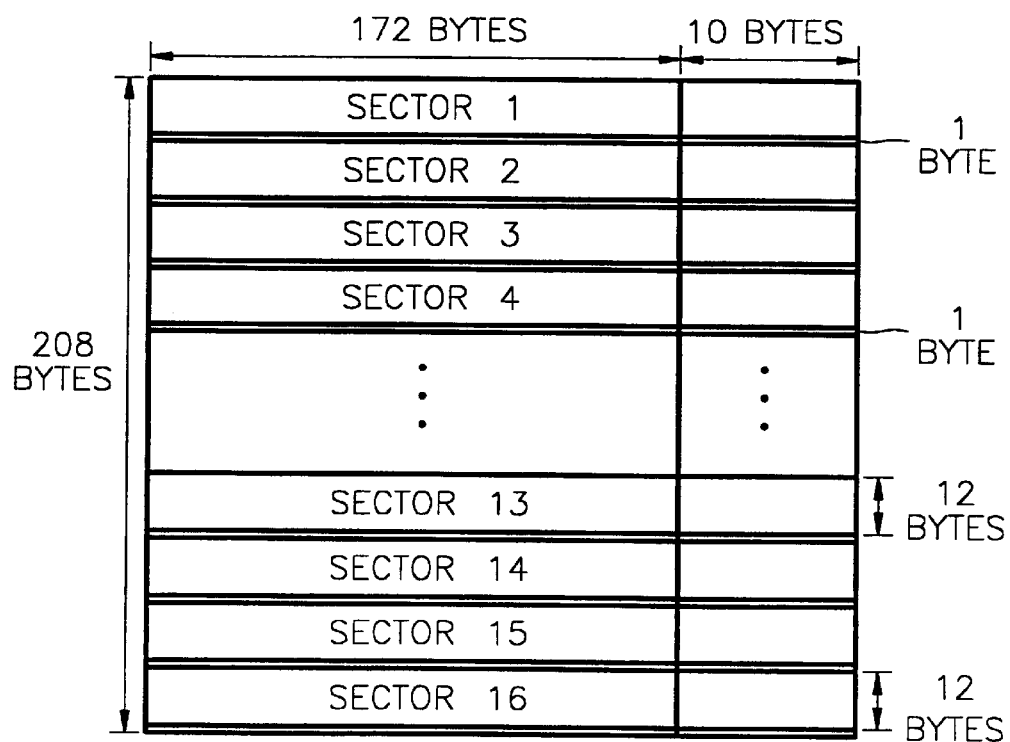
FIG. 2 is a view illustrating an interleaved error correction block for a general DVD.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
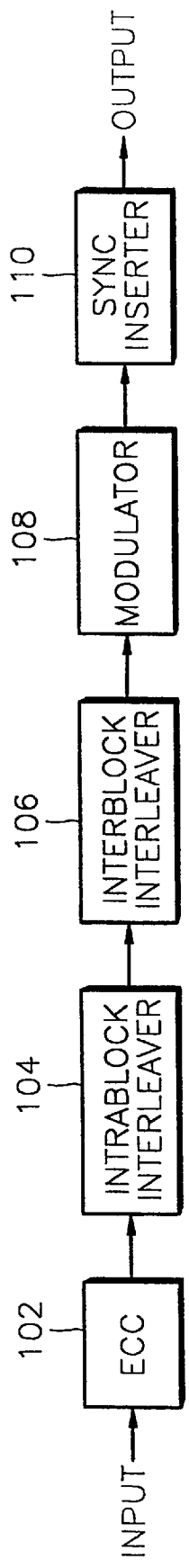
FIG. 3 is a block diagram of a channel modulator in an optical recording and reproducing apparatus adopting an interleaving circuit according to the present invention.

In the block diagram of FIG. 3 showing a channel modulator in an optical recording and reproducing apparatus adopting an interleaving circuit, an error correction coder (ECC) 102 error-correction codes data read from an HD-DVD and provides error-correction coded data. An error correction code used in the ECC 102 is the same as, for example, an RS (208, 192, 17) code used in a general DVD. Here, RS is an abbreviation of a Reed-Solomon code, 208 denotes the number of codewords, 192 denotes the size of user data within the total codewords, and 17 denotes a value obtained by adding one to the number of parities.

An intrablock interleaver 104 performs intrablock interleaving on data that has been error-correction coded by the ECC 102. That is, intrablock interleaving is performed by interleaving 16 outer parity rows with sectors by adding one outer parity row to the end of each sector, in the same way as row interleaving for a general DVD format. An interblock interleaver 106 performs interblock interleaving in units of two intrablock-interleaved error correction blocks, and does not interleave the first row of each sector having an identification (ID).

A modulator 108 modulates data that has been interblock-interleaved by the interblock interleaver 106, using a predetermined modulation scheme (here, 8-to-16 modulation). A sync inserter 110 inserts two 32-bit sync patterns with respect to the modulated data and outputs the resultant data to be recorded on a disc.

First, an HD-DVD recording format applied to the present invention will be described.

In an embodiment of an HD-DVD recording format used in the present invention, the track pitch is 0.42 $\mu$m, and the minimum mark length is 0.22 $\mu$m. According to this embodiment, the amount of data capable of being recorded in an area that is the same as the area of a DVD is calculated as follows.

Since the area of a circle is $\pi r^2$ (where r is the radius of a circle), the recordable area of a disc is calculated using an outer circumference of $\pi(58 \text{ mm})^2$ (0.01056832 $m^2$) and an inner circumference of $\pi(24 \text{ mm})^2$ (0.0018095 $m^2$). The actual data area is obtained by subtracting the inner circumference from the outer circumference, and thus comes to 0.00875876 $m^2$. Here, since the track pitch is 0.42 $\mu$m, and the minimum mark length is 0.22 $\mu$m (3T=3 bits), the area occupied by 3 bits is 9.24e–14 $m^2$ obtained by 0.42 $\mu$m×0.22 $\mu$m, and the area occupied by one bit is 3.08e–14 $m^2$ obtained by 9.24e–14 $m^2$/3. Since the recordable data area is 0.0087587 $m^2$, 2.84e+11 bits are calculated by dividing the recordable data area (0.0087587 m²) by the area occupied by one bit (3.08e−14 m²). Since the 2.84e+11 bits are 8-to-16 modulated, 2.84e+11/2 bits are calculated as the value before 8-to-16 modulation. The 2.84e+11 bits are 17.777 Gbytes ((2.84e+11/2)/8) in byte units.

Rates occupied by an error correction parity and a sync pattern other than user data in an error correction block used in a general DVD are calculated as follows.

The total amount of user data is 33024 bytes (=192×172). The amount of parity is 4832 bytes (=16×182+192×10). The size of a sync pattern is 1664 bytes (=(208×32×2)/8). Thus, the total amount of redundancy is 6496 bytes (=4832+1664), and the total amount of data is 39520 bytes (=33024+6496). The ratio of the total amount of redundancy to the total amount of data is 16.437% obtained by 6496/39520. When the total size of redundancy in an HD-DVD is set as X, X comes to 2.922e+9 calculated by the following equation of 6496:39520=X:17.777e+9. Hence, the actual amount of recordable user data is 14.8 Gbyte obtained by 17/777e+9−2.922e+9. The error correction capability must be large enough so as to correct at least about 6.3 mm in the tangential direction of a disc. When the length of a minimum mark recorded on a disc is 0.22 $\mu$m (3T=3 bits), if the number of error correctable bits is indicated by X, X is 85909 bits obtained by the following equation of 6.3 mm:X= 0.22 $\mu$m:3 bits. Also, X is 42954 bits (=85909/2) in 16-to-8 demodulated values, and 5369 bytes (=42954/8) in byte units. According to X, an error correction block of a DVD includes 29.5 rows of 182 bytes. Here, a sync pattern is not counted in the row-directional 182 bytes, so that the number of parities necessary for error correction must be calculated in consideration of the sync pattern. That is, since the sync pattern in each row is comprised of 64 bits and it is predetermined, 28.2 rows are obtained by calculation of the following formula of 5369/(182+64/8). This value is the number of parities necessary for column-directional error correction. Therefore, at least 29 bytes in the column direction can be corrected by outer error correction.

When a recording format according to another embodiment of an HD-DVD to which the present invention is applied is also interleaved with the interval between tracks being 0.4 $\mu$m and the minimum mark length being 0.22 $\mu$m, error correction can be made even when a scratch of 6.5 mm is generated. The actual amount of recordable user data can be calculated as follows.

As described above, a data region capable of being recorded in an area such as a DVD-ROM is 0.0087587 m², the track pitch is 0.4 $\mu$m, the minimum pitch is 0.22 $\mu$m (3T=3 bits), the area occupied by 3 bits is 8.8e−14 m² obtained by 0.4 $\mu$m×0.22 $\mu$m, the area occupied by one bit is 2.93e−14 m² obtained by 8.8e−14 m²/3, and the recordable data area is 0.0087587 m². Accordingly, 2.98e+11 bits are obtained by dividing the recordable data area of 0.0087587 m² by the area for one bit of 2.93e−14 m². The 2.98e+11 bits are 8-to-16 modulated, so 2.98e+11/2 bits are calculated as the value before 8-to-16 modulation. The 2.98e+11 bits are 18.6 Gbytes ((2.98e+11/2)/8 bytes) in bytes.

In a DVD error correction block, the total amount of user data is 33024 bytes as described above, the amount of parity is 4832 bytes, and the size of a sync pattern is 1664 bytes. Accordingly, a total amount of redundancy is 6496 bytes, a total amount of data is 39520 bytes.

The ratio of the total amount of redundancy to the total amount of data is 16.437% obtained by 6496/39520. Thus, when the total size of redundancy in an HD-DVD is represented by X, X is obtained by calculation of the following equation of 6496:39520=X:18.6e+9. Therefore, a real recordable user data amount is 15.5 Gbytes calculated by subtracting 3.057e+9 from 18.6e+9.

To sum up, the HD-DVD recording format according to the present invention has an error correctable length of 6.5 mm in the tangential direction of a disc, which is increased from 6.3 mm in a general DVD recording format, while maintaining compatibility with the general DVD format. Also, the HD-DVD recording format maintains the error correction capability required for current optical discs while allowing the recording capacity to increase to 15.5 Gbytes. In order to increase the error correction length to 6.5 mm, an HD-DVD recording format having a track pitch whose length is reduced from 0.74 $\mu$m to 0.42 $\mu$m and a minimum recording mark whose length is reduced from 0.4 $\mu$m to 0.22 $\mu$m is used. In order to increase the recording capacity to 15.5 Gbytes, another HD-DVD recording format having a 0.4 $\mu$m track pitch and a 0.22 $\mu$m minimum recording mark is used. In still another recording format according to the present invention, a track pitch of 0.4 $\mu$m or 0.42 $\mu$m and a minimum recording mark of 0.25 $\mu$m can be used.

Meanwhile, a method of reducing the area required to record one bit is the most generally used to increase the recording capacity of an optical disc. While a CD is transformed into a DVD using the above-described method, the recording capacity thereof is increased about 4.8 times. In this way, the wavelength of a laser used in a pick-up unit must also be reduced according to the characteristics of the optical disc, so that the error rate is increased during data detection. Also, the number of bits that cannot be error-corrected is increased in the DVD rather than the CD even when an identical scratch is formed on a disc surface. Thus, an error correction method for a DVD player must be able to correct more errors than an error correction method for a CD player.

In an HD-DVD capable of recording a greater amount of information than the DVD can record, the area required to record one bit is reduced to about 1/3.36 so that information of about 15 Gbytes is recorded on one HD-DVD. Accordingly, the error correction capability must also be increased. In the present invention, in order to increase the error correction capability of an HD-DVD, adjacent sectors in error correction blocks are separated far away from each other by intrablock interleaving and interblock interleaving and recorded in the HD-DVD. Thus, error is prevented from continuing in each error correction block due to a scratch formed on the disc, thereby increasing the magnitude of a correctable burst error.

Figure 4:
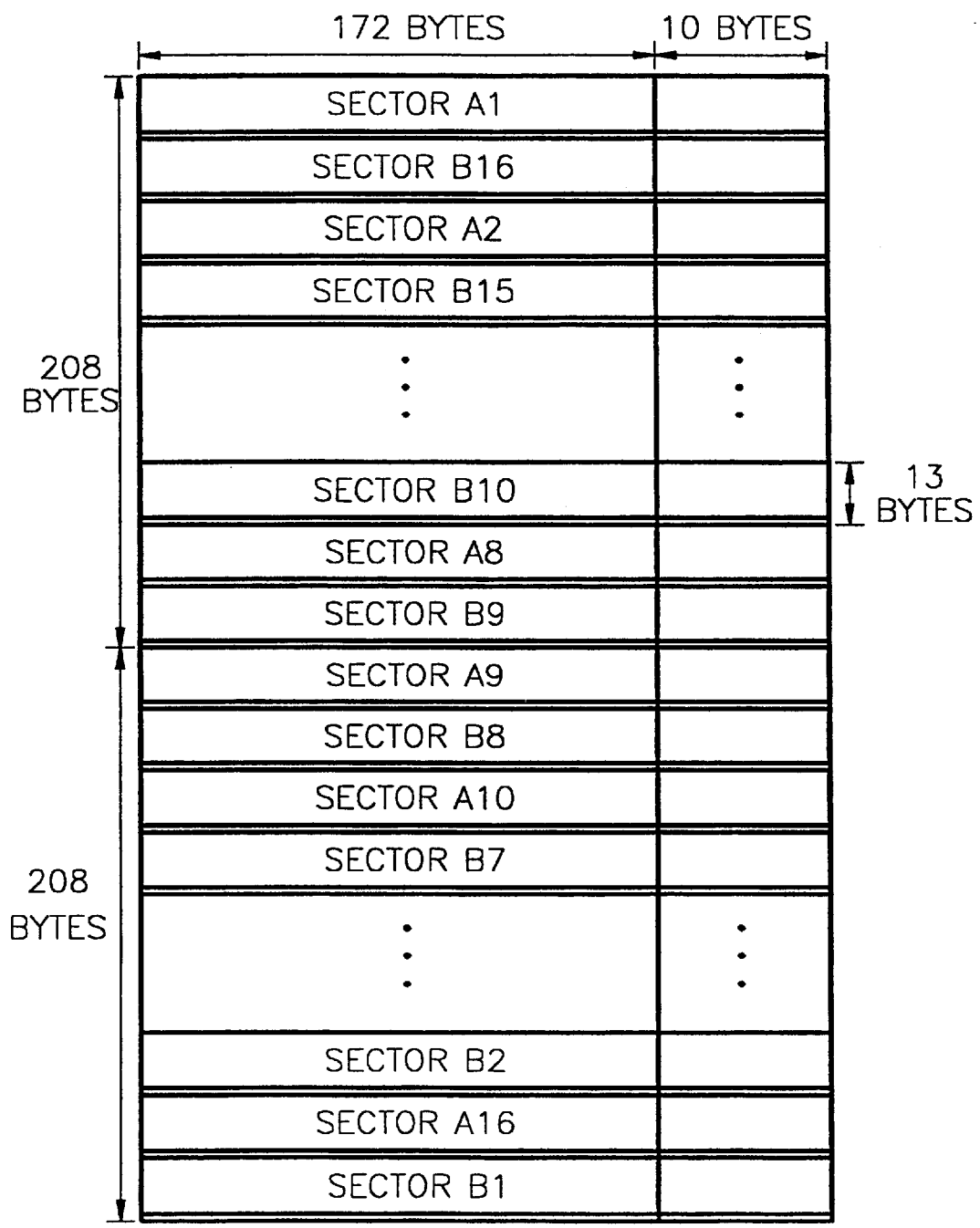
FIG. 4 is a view illustrating interleaving between error correction blocks according to a first embodiment of the present invention.
Figure 5:
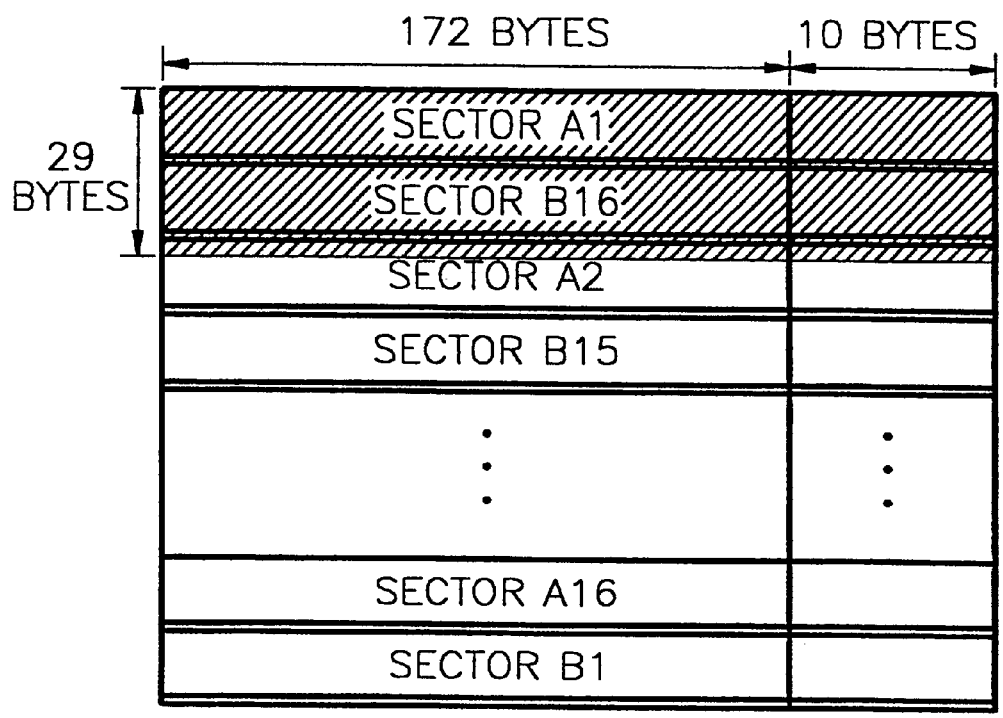
FIG. 5 is a view illustrating an error correctable range after interblock interleaving according to the first embodiment of the resent invention.

FIG. 4 illustrates an interblock interleaving method according to an embodiment of the present invention capable of being applied to the interblock interleaver 106 of FIG. 3. In FIG. 4, if error correction blocks have an A block and a B block, respectively, wherein the A block is comprised of sector A1, sector A2, . . . , sector A16, and the B block is comprised of sector B1, sector B2, . . . , sector B16, the sequence of interblock interleaving is A1, B16, A2, B15, A3, B14, . . . , A14, B3, A15, B2, A16 and B1. When the interblock interleaving is performed in this way, a maximum error of 29 bytes generated in the column direction can be corrected as shown in FIG. 5.

In the present invention, a method of increasing the error correction parity is not used to improve the error correction capability, but a method of increasing the error correction capability with respect to a burst error by interleaving the sectors of two adjacent error correction blocks is used.

The sequence of data recorded on a disc is made different to the sequence of data arranged in an error correction block, so that an effect due to a scratch which may be generated on a certain area of a disc, is dispersed over the plurality of error correction blocks (here, two blocks). That is, interblock interleaving according to the present invention provides an effect in which data damaged by a scratch on a disc is spread over several places, so that the size of data capable of being error-corrected is enlarged as compared to a general DVD. In the HD-DVD, the size of a correctable burst error is calculated as follows.

In a general DVD, the correction range of a burst error capable of being corrected by an RS code is 16 rows×182 bytes. After interblock interleaving is performed as shown in FIG. 4, the maximum correctable length is 16 rows for the A block (error correction block). Thus, if error is generated in 13 rows in the sector A1 and 3 rows in the sector A2, it can be considered that the maximum correctable error is generated in this case. A correctable burst error correction range after interblock interleaving according to a first embodiment of the present invention comes to 29 rows by summing 13 rows in the first sector of the A block, 13 rows in the sixteenth sector of the B block (error correction block), and 3 rows in the second sector of the A block, as shown in FIG. 5.

Figure 6A:
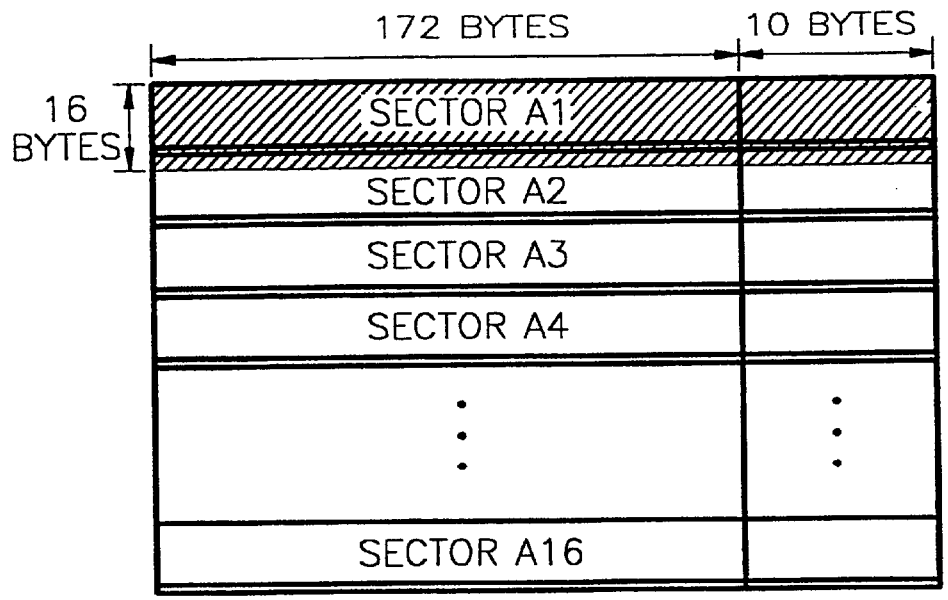
FIGS. 6A and 6B are views illustrating the error correctable range from a de-interleaved perspective, in which the interleaved blocks shown in FIG. 5 are rearranged into original error correction blocks.
Figure 6B:
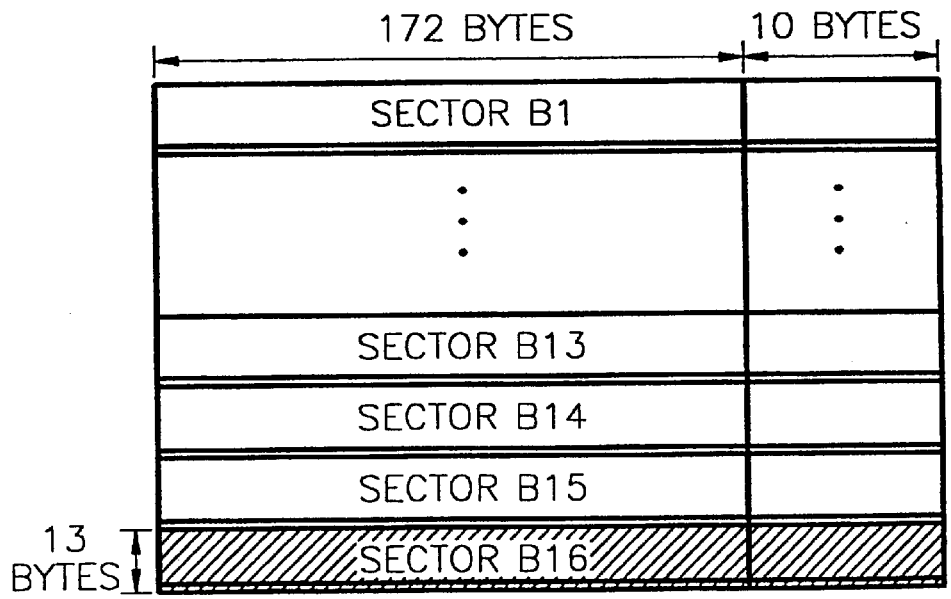

When the interblock-interleaved results according to the first embodiment of the present invention are rearranged in units of an error correction block, an error correction block sequentially having a sector A1, a sector A2 and so on, is formed as shown in FIG. 6A, and another error correction block sequentially having a sector B1, a sector B2 and so on, is formed as shown in FIG. 6B. Here, each error correction block can correct an error of 16 bytes in the column direction, such that an error must be generated in 13 bytes in the sector A1 and 3 bytes in the sector A2 to constitute 16 bytes in the column direction in the A block. This is the case in which an error is continuously generated in 13 bytes of the sector A1, 13 bytes of the sector B16, and 3 bytes in the sector A2 in a real disc, as shown in FIG. 5.

Thus, an error in the HD-DVD can be corrected by using an error correction code used for a general DVD even when an error is generated in a total of 29 bytes in the column direction. That is, an error of a maximum of 5287 bytes (=29×182) can be corrected without adding an error correction parity. When this error is calculated as the length in a tangential direction of an HD-DVD, and if a sync pattern is the same as that in a current DVD, a sync pattern of 64 bits in each row direction is added to an error correction block.

The sync pattern is comprised of 5510 bytes obtained by 29×(64/8+182), and 5510 bytes is 44080 bits (=5510×8). The sync pattern is doubled through 8-to-16 modulation, and thus corresponds to 29386 minimum marks obtained by dividing 88160 by 3. Therefore, a maximum correctable error length is 6.5 mm which is the product of 29386 and 0.22 μm.

In the first embodiment of the present invention, interblock interleaving is performed in units of two adjacent error correction blocks, but the present invention is not restricted to the above first embodiment. Interblock interleaving can also be performed with respect to two or more error correction blocks. In another example of interblock interleaving for improving the error correction capability, odd-numbered sectors in each error correction block can be interleaved, and likewise for even-numbered sectors, resulting in two error correction blocks. Here, loss can be generated by interblock interleaving during a disc access time, and an interblock interleaving method capable of preventing generation of the loss will now be described.

Figure 7:
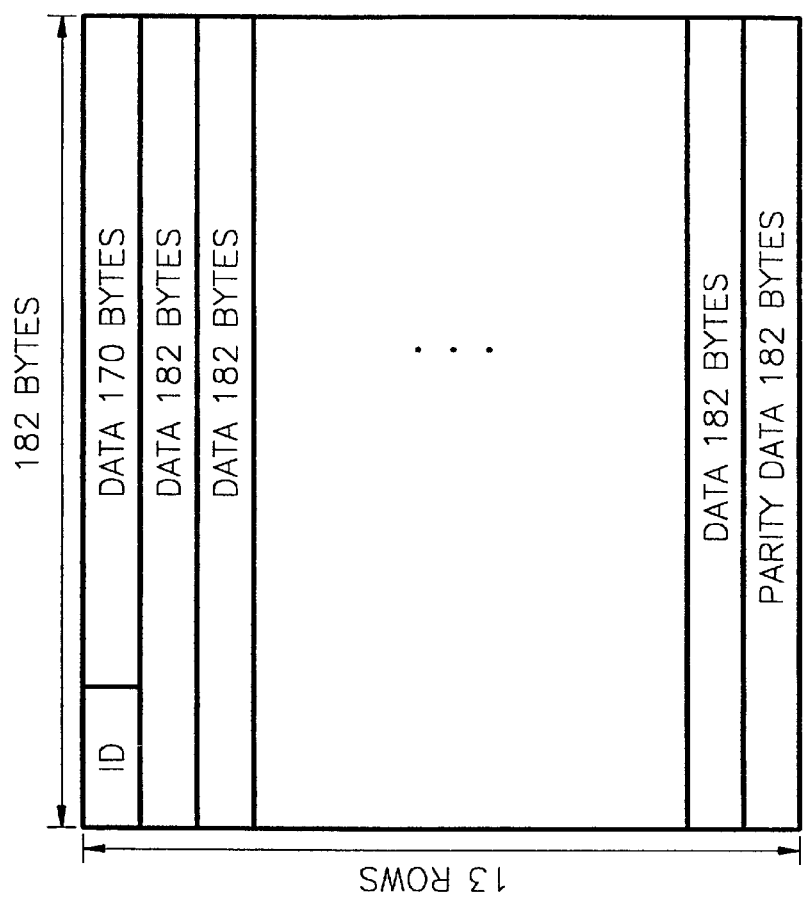
FIG. 7 is a view illustrating the structure of one sector after intrablock interleaving according to the first embodiment of the present invention.

As shown in FIG. 7, a sector on which intrablock interleaving has been performed includes a position information ID in the first row thereof. When interblock interleaving is performed using two error correction blocks, a row having an ID (12 bytes) is fixed in its position while the remaining rows are intersector interleaved.

If there are A and B error correction blocks, the A block (error correction block) is comprised of sector A1, sector A2, . . . , sector A16, and the B block (error correction block) is comprised of sector B1, sector B2, . . . , sector B16. The sector A1 of 182 bytes sequentially has A101, A102, A103, . . . , A113, the sector A2 of 182 bytes sequentially has A201, A202, A203, . . . , A213, the sector B1 of 182 bytes sequentially has B101, B102, B103, . . . , B113, and the sector B2 of 182 bytes sequentially has B201, B202, B203, . . . , B213. Here, A101, A201, A301, . . . , A1601 and B101, B201, B301, . . . , B1601 each having an ID fix their positions upon interleaving, while interleaving between two error correction blocks can be performed with respect to the remaining data in units of one row (that is, 182 bytes). For example, 182 bytes of a row in the A block other than the bytes in rows where the corresponding ID exists can be arranged at any position except for the rows where the ID of the A and B blocks exist.

When the first row of each sector having an ID is used without change in position, IDs representing the position of data on a disc are sequentially recorded in the disc. Thus, the access time for the disc can be maintained the same as that in a general DVD. The error correction capability can be improved by performing interblock interleaving with respect to the remaining data including parity data in the last row, except for the first row having an ID.

Figure 8:
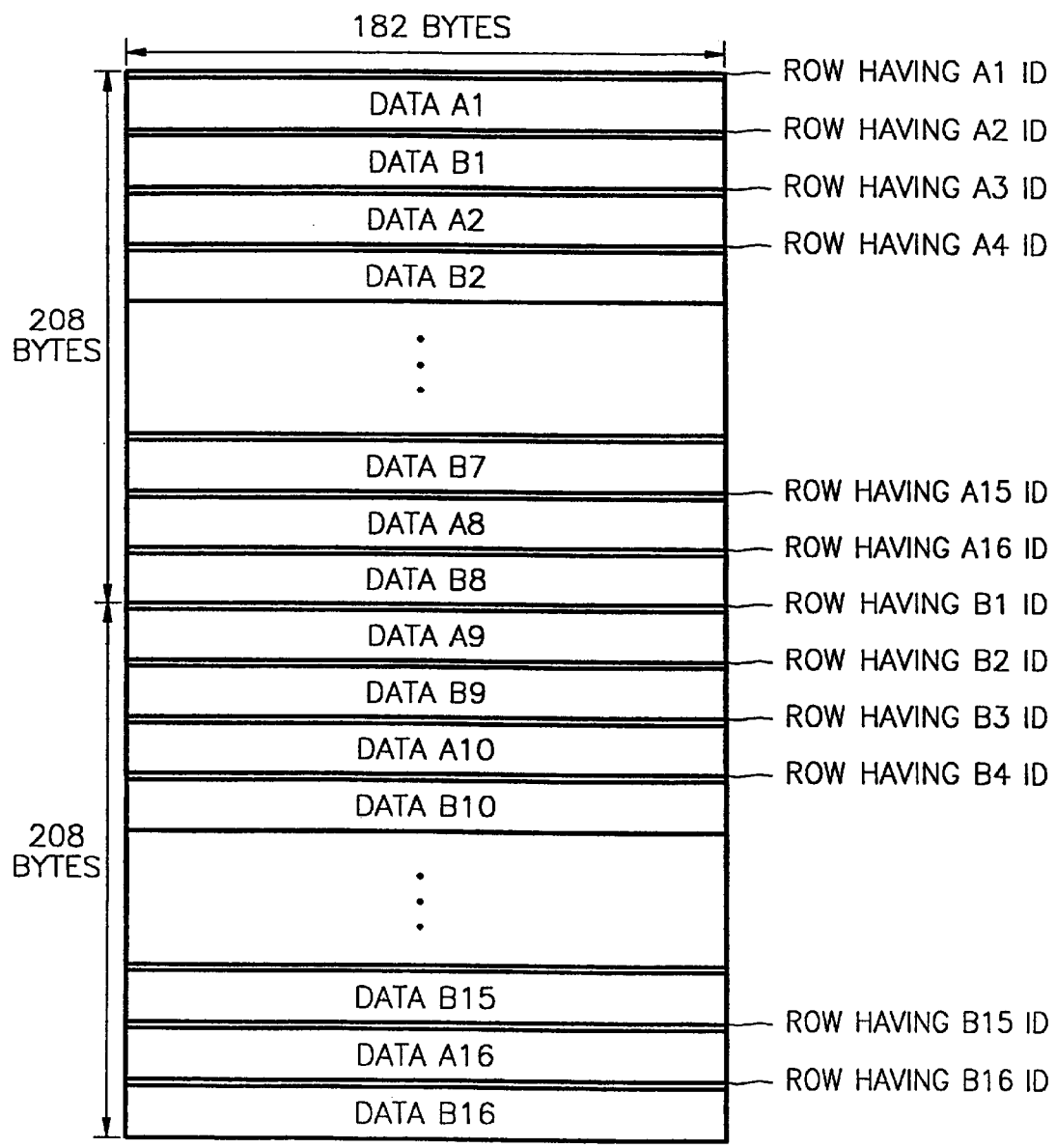
FIG. 8 is a view illustrating interblock interleaving according to a second embodiment of the present invention.

In FIG. 8 showing interblock interleaving according to a second embodiment of the present invention, interleaved data is arranged in the sequence of a row (182 bytes) having an ID for the first sector in an A block, 12 rows except for the first row having the ID for the first sector in the A block, a row having an ID for the second sector in the A block, 12 rows except for the first row having an ID for the first sector in a B block, . . . , a row having an ID for the fifteenth sector in the B block, 12 rows except for the first row having an ID for the sixteenth sector in the A block, a row having an ID for the sixteenth sector in the B block, and 12 rows except for the first row having the ID for the sixteenth sector in the B block.

In the present invention, except for rows having an ID, the data of adjacent error correction blocks is interleaved in units of a sector and recorded in the HD-DVD. Therefore, a scratch formed on the disc is not continuous in the error correction block, thereby increasing the size of a correctable burst error.

The maximum size of a burst error capable of being corrected in a DVD format is 16 rows×182 bytes. A maximum correctable length after interblock interleaving according to the second embodiment of the present invention based on the maximum burst error can be calculated as follows.

Assuming that an error is generated in a row having an ID for the sector A1, a row having an ID for the sector A2, 12 rows in the sector B1, and two rows in the sector A2, consequently, the error is generated in 16 (=13+1+2) rows with respect to the A block. Hence, it can be considered that a maximum correctable error is generated in this case. Since the above block is interleaved, the maximum size of a correctable error is 28 (=1+12+1+12+2) bytes in the column direction, and the entire size is 28×182 bytes.

Figure 9:
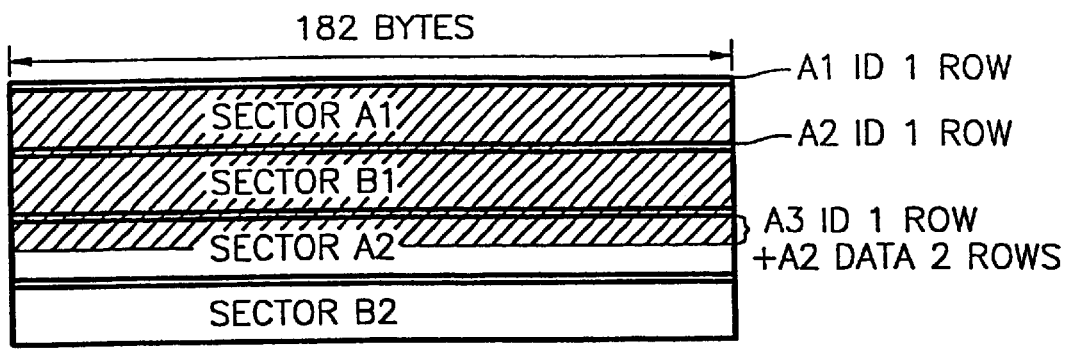
FIG. 9 is a view illustrating an error correctable range after interblock interleaving according to a second embodiment of the present invention.
Figure 10A:
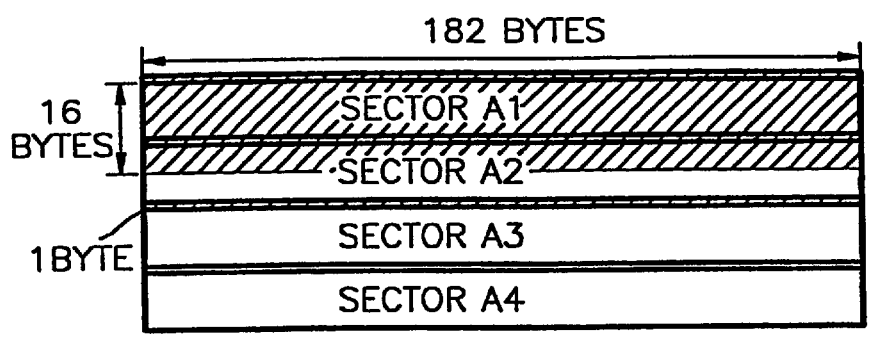
FIGS. 10A and 10B are views of error correction blocks rearranged from the interblock interleaved result shown in FIG. 9.
Figure 10B:
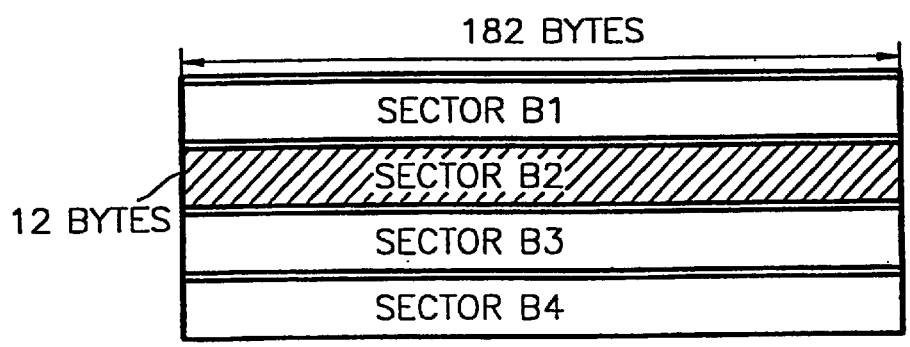

FIG. 9 shows a case in which a maximum correctable error is generated after the interblock interleaving according to the second embodiment of the present invention. When the interleaved error correction blocks are rearranged in an error correction unit, sectors for an A block are collected and arranged in a sequence of sector A1, sector A2 and so on, to form an error correction block as shown in FIG. 10A, and sectors for a B block are collected and arranged in sequence of sector B1, sector B2 and so on, to form another error correction block as shown in FIG. 10B.

Here, each error correction block can correct 16 bytes in the column direction. In order to constitute 16 bytes in the column direction in the A block, an error must be generated in 13 bytes in sector A1, in one byte having an ID for sector A2, and in two bytes in the sector A2. Here, a row having an ID for sector A3 is not continuous in the A block shown in FIG. 10A.

Then, this is a case in which an error is continuously generated in one byte having an ID for sector A1, 12 bytes data in the sector A1, one byte having an ID for sector A2, 12 bytes data in sector B1, and 2 bytes data in the sector A2. These erroneous data bytes sum into 28 bytes (=13+1+12+2). Even when all 28 byte errors are vertically generated in an HD-DVD, the errors can be corrected by using an error correction code used for general DVD. Thus, a maximum of 5096 byte errors (=28×182) can be corrected without adding an error correction parity.

The maximum size of an error-correctable scratch can be recognized through calculation of this maximum error value in the tangential direction of a disc. Here, if a sync pattern is the same as that in a general DVD, a sync pattern having rows each comprised of 64 bits is added to an error correction block. Hence, the sync pattern is comprised of 5320 bytes obtained by calculation of 28×(64/8+132), and the 5320 bytes are 42560 bits (=5320×8) which are doubled to 85120 bits (=42560×2) in 8-to-16 modulation. When the length of a real 3T is set as 0.22 μm in the present invention, it corresponds to 28373 (=85120/3) minimum marks. Thus, the length of errors that can be corrected is 6.24 mm (=28373×0.22 μm).

Figure 11:
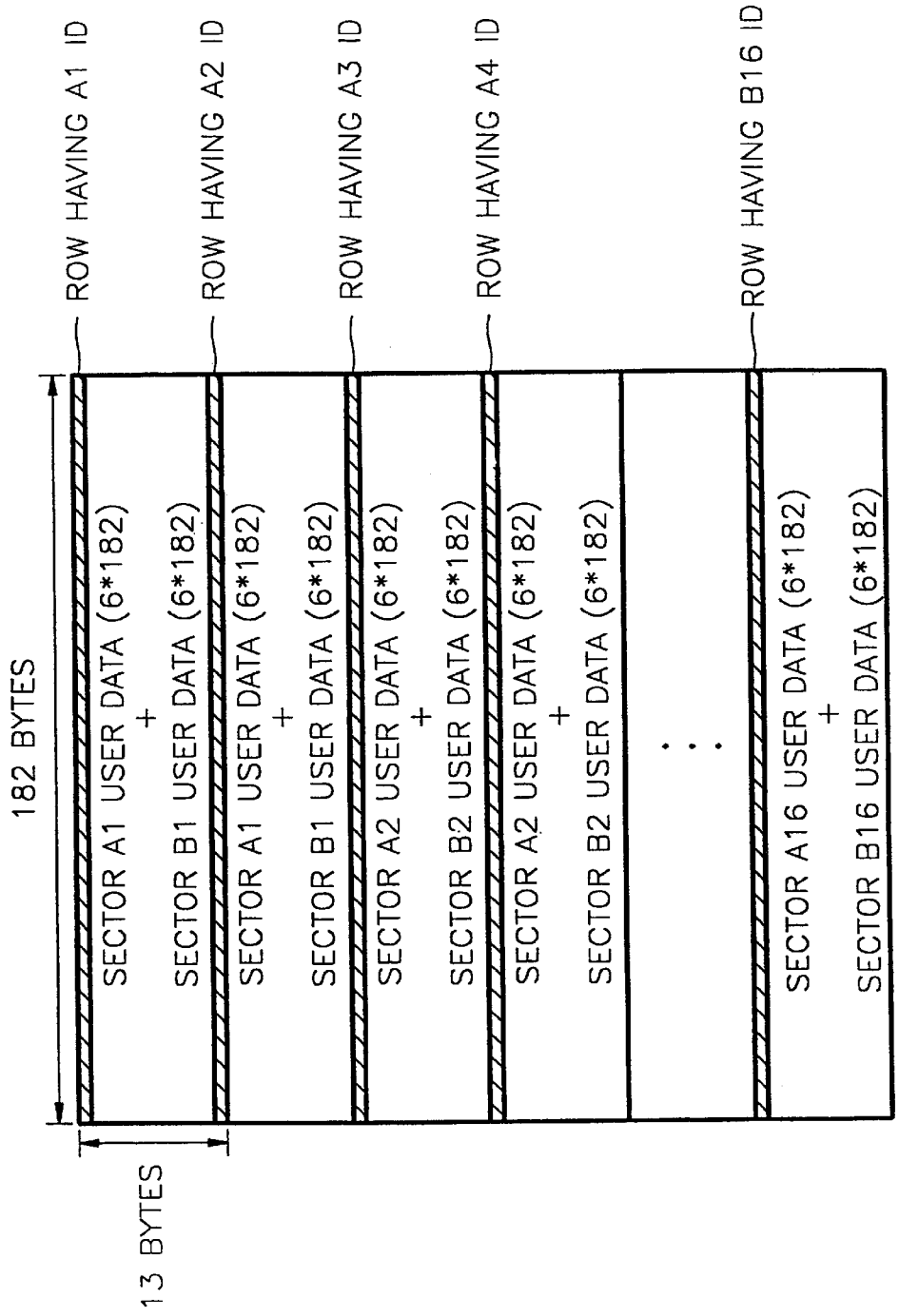
FIG. 11 is a view illustrating interblock interleaving according to a third embodiment of the present invention.

FIG. 11 illustrates interblock interleaving according to a third embodiment of the present invention. In FIG. 11, except for rows each having an ID, half of each sector in one error correction block and half of each sector in the other error correction block are arranged as one sector when interleaving is performed between two error correction blocks. That is, as shown in FIG. 12, the two error correction blocks are interleaved by sequentially arranging a row (182 bytes) having the ID of a first sector for an A block (error correction block), the first six rows except for the first row having the ID of the first sector for the A block, the first six rows except for a first row having the ID of the first sector for a B block (error correction block), a row having the ID of the second sector for the A block, the remaining six rows of the first sector for the A block and the remaining six rows of the first sector of the B block, . . . , a row having the ID of a fifteenth sector for the B block, the first six rows except for the first row having the ID of a sixteenth sector for the A block and the first six rows except for the first row having the ID of a sixteenth sector for the B block, a row having the ID of the sixteenth sector for the B block, and the remaining six rows of the sixteenth sector for the A block and the remaining six rows of the sixteenth sector for the B block.

In the present invention, interblock interleaving as well as intrablock interleaving are performed, so that a correctable burst error becomes larger than a correctable burst error in a general DVD. A correctable length can also be increased from about 6.3 mm in the general DVD to 6.5 mm. Hence, an HD-DVD has a stronger burst error correction capability than a DVD-ROM. An error correction code and an error correction block for general DVDs used in DVD-family products such as DVD-ROMs, DVD-RAMs (random access memory), DVD-RW (rewritable) can be used in the HD-DVD without change.

Figure 12:
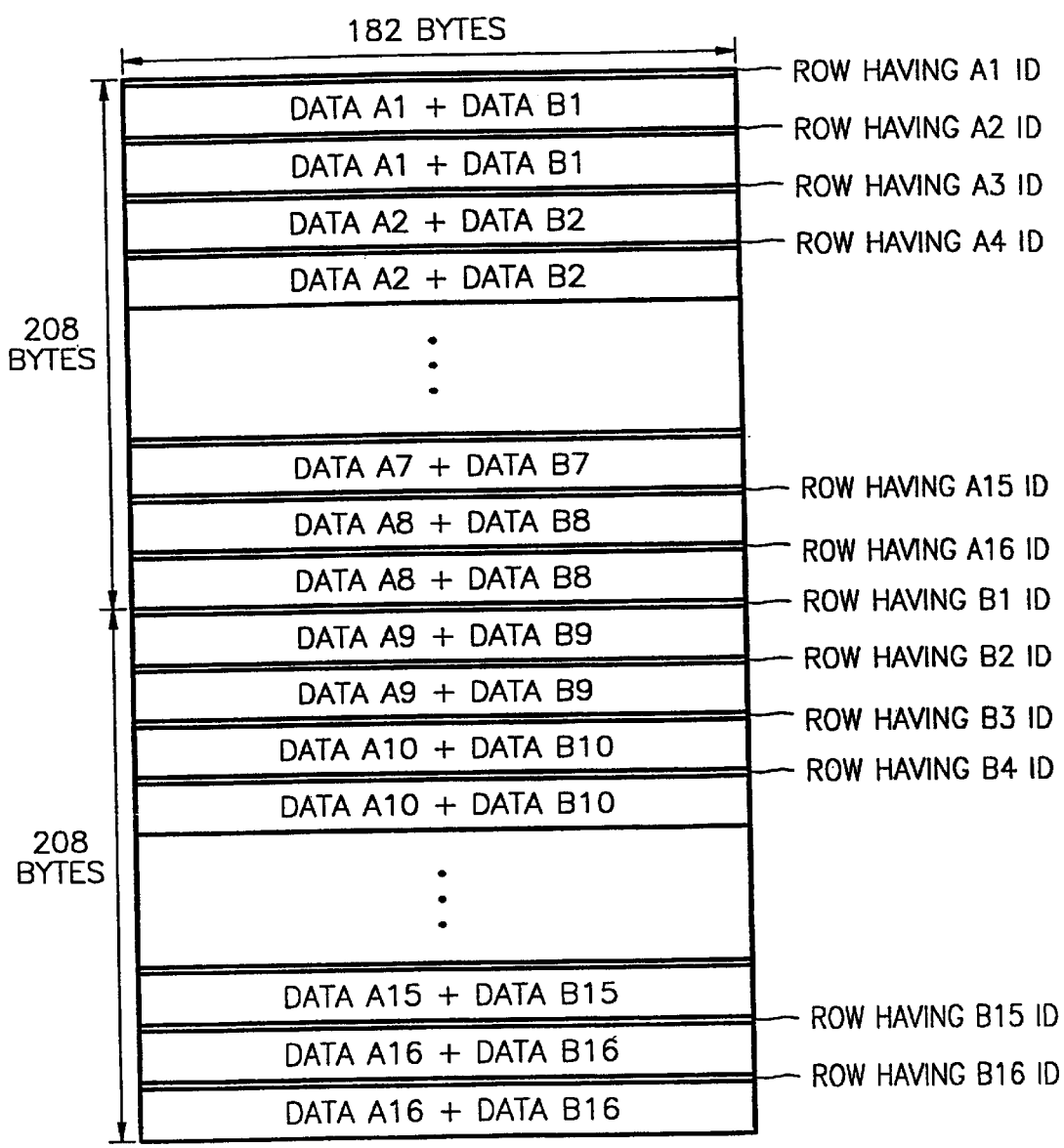
FIG. 12 is a view illustrating an interblock interleaved result according to the third embodiment of the present invention.

As shown in FIGS. 8 and 12 according to the present invention, intersector interleaving is performed with respect to two error correction blocks. That is, while leaving the first row of each sector having an ID in its original position, the other data is interleaved between sectors, so that the IDs informing of positions on a disc are not interleaved. Accordingly, the error correction capability is improved with an access time of the same level as a current DVD. Therefore, loss of access time can be prevented while having a stronger burst error correction capability than a DVD.

In order to prevent loss of access time, the first row of each sector having an ID may not be interleaved during the interblock interleaving shown in FIG. 4 according to the present invention.

According to the present invention as described above, interblock interleaving as well as intrablock interleaving are performed in an error correction code having the same format as a general DVD format, thereby improving the capability of correcting a burst error due to a scratch on a disc. Therefore, the present invention maintains compatibility with the DVD format. Also, each row having position information is not interleaved between blocks, thus making it possible for high-speed searching without loss of access time due to interblock interleaving.

What is claimed is:

1. An interleaving method of improving an error correction capability of a high density recording medium, the method comprising:
   (a) generating first interleaved data by interleaving received data having a predetermined error correction code within error correction blocks; and
   (b) generating second interleaved data by interleaving the first interleaved data between the error correction blocks in units of a predetermined number of the error correction blocks.

2. The interleaving method of claim 1, wherein the error correction code and a size of each error correction block are represented by an RS (208, 192, 17), wherein RS is an abbreviation of a Reed-Solomon code, 208 is a total number of codewords, 192 is a size of user data within a total of the codewords, and 17 is a value obtained by adding one to a number of outer parities.

3. The interleaving method of claim 1, wherein said step (b) comprises interleaving sectors in two adjacent error correction blocks.

4. The interleaving method of claim 3, wherein if the two adjacent ones of the error correction blocks include an A block comprised of sector A1, sector A2, . . . , sector A16 and a B block comprised of sector B1, sector B2, . . . , sector B16, respectively, said step (b) comprises performing the interblock interleaving in an order of A1, B16, A2, B15, A3, B14, . . . , A14, B3, A15, B2, A16 and B1.

5. The interleaving method of claim 4, wherein a row having position information in each sector in each error correction block is not interleaved but fixed in said step (b).

6. The interleaving method of claim 3, wherein said step (b) comprises interleaving odd-numbered sectors in each of the two adjacent error correction blocks, and interleaving even-numbered sectors in the each of two adjacent error correction blocks.

7. The interleaving method of claim 1, wherein said step (b) comprises interleaving sectors in each of at least two adjacent error correction blocks.

8. The interleaving method of claim 7, wherein a row having the position information of each sector in each error correction block is not interleaved but fixed in said step (b).

9. The interleaving method of claim 8, wherein said step (b) comprises interleaving sectors in each error correction block in units of two adjacent error correction blocks, and when the two adjacent error correction blocks are an A block and a B block, respectively, interleaving the sectors by arranging in order of a row having an ID for a first sector in a A block, 12 rows except for the row having the ID for the first sector in the A block, a row having an ID for a second sector in the A block, 12 rows except for a row having an ID for a first sector in the B block, . . . , a row having an ID for a fifteenth sector in the B block, 12 rows except for a row having an ID for a sixteenth sector in the A block, a row having an ID for a sixteenth sector in the B block, and 12 rows except for the row having the ID for the sixteenth sector in the B block.

10. The interleaving method of claim 8, wherein said step (b) comprises interleaving sectors in each error correction block in units of two adjacent error correction blocks, and when the two adjacent error correction blocks are an A block and a B block, respectively, interleaving the two adjacent error correction blocks by sequentially arranging in order of a row having an ID of a first sector in the A block, the first six rows except for the row having the ID of the first sector in the A block and the first six rows except for a row having an ID of a first sector in the B block, a row having an ID of the second sector in the A block, the other six rows of the first sector in the A block and the remaining six rows of the first sector in the B block, . . . , a row having an ID of a fifteenth sector in the B block, the first six rows except for the row having an ID of the sixteenth sector in the A block and the first six rows except for a row having an ID of a sixteenth sector in the B block, a row having the ID of the sixteenth sector in the B block, and the remaining six rows of the sixteenth sector in the A block and the remaining six rows of the sixteenth sector in the B block.

11. The interleaving method of claim 7, wherein the row having the position information of each sector is not interleaved but fixed in units of two error correction blocks, and said step (b) comprises interblock-interleaving the sectors in units of a row.

12. The interleaving method of claim 11, wherein when the two error correction blocks are an A block and a B block, each row in the A block other than the rows having the position information is arrangeable at all positions except for the rows in the A and B blocks having the position information.

13. The interleaving method of claim 1, wherein a length of a minimum mark of the recording medium is 0.22 μm, a length of track pitch thereof is 0.42 μm, a recordable user data capacity is about 14.8 GBytes, and an error-correctable length on the recording medium is about 6.5 mm.

14. The interleaving method of claim 1, wherein a length of a minimum mark of the recording medium is 0.22 μm, a length of a track pitch thereof is 0.4 μm, a recordable user data capacity is about 15.5 GBytes, and an error-correctable length on the recording medium is about 6.5 mm.

15. The interleaving method of claim 1, wherein the received data is error-correctable with respect to a maximum of a 29-byte burst error.

16. An interleaving circuit for improving an error correction capacity of a high density recording medium, the interleaving circuit comprising:
    an intrablock interleaver which interleaves received data having a predetermined error correction code within error correction blocks to output intrablock-interleaved data; and
    an interblock interleaver which interleaves the intrablock-interleaved data between the error correction blocks in units of a predetermined number of the error correction blocks, to output interblock-interleaved data.

17. The interleaving circuit of claim 16, wherein the error correction code and a size of each error correction block are represented by an RS (208,292,17) which is compatible with a DVD-ROM, a DVD-RAM and a DVD-RW, wherein RS is an abbreviation of a Reed-Solomon code, 208 is total number of codewords, 192 is a size of user data within a total of the codewords, and 17 is a value obtained by adding one to a number of outer parities.

18. The interleaving circuit of claim 16, wherein the interblock interleaver interleaves sectors in two adjacent ones of the error correction blocks.

19. The interleaving circuit of claim 18, wherein the interblock interleaver interleaves odd-numbered sectors and interleaves even-numbered sectors in each of the two adjacent error correction blocks.

20. The interleaving circuit of claim 16, wherein the interblock interleaver interleaves at least two adjacent ones of the error correction blocks.

21. The interleaving circuit of claim 20, wherein the interblock interleaver does not interleave but fixes a row having position information of each sector in the at least two adjacent error correction blocks.

22. The interleaving circuit of claim 21, wherein the interblock interleaver does not interleave but fixes the row having the position information of each sector in units of two adjacent error correction blocks, and interblock-interleaves the sectors in units of a row.

23. The interleaving circuit of claim 22, wherein when the two adjacent error correction blocks are an A block and a B block, respectively, and each row in the A block other than the rows having the position information is arrangeable at all positions except for the rows in the A and B blocks having the position information.

24. The interleaving circuit of claim 16, wherein the received data is error-correctable with respect to a maximum of a 29-byte burst error.

25. The interleaving circuit of claim 16, wherein a length of a minimum mark of the recording medium is 0.22 μm, a length of a track pitch thereof is 0.42 μm, a recordable user data capacity is about 14.8 GBytes, and an error-correctable length on the recording medium is about 6.5 mm.

26. The interleaving circuit of claim 16, wherein a length of a minimum mark of the recording medium is 0.22 μm, a length of a track pitch thereof is 0.4 μm, a recordable user data capacity is about 15.5 GBytes, and an error-correctable length on the recording medium is about 6.5 mm.

27. An interleaving method of improving error correction capability of received data forming error correction blocks and corresponding to a recording medium, the method comprising:
    interleaving the received data having a predetermined correction code within each error correction block, to generate first interleaved data; and
    interleaving the first interleaved data of at least two of the error correction blocks, to generate second interleaved data.

28. The interleaving method of claim 27, wherein each error correction block has a plurality of sectors, the interleaving of the first interleaved data comprising interleaving the sectors of a first one of the error correction blocks and the sectors of a second adjacent one of the error correction blocks.

29. The interleaving method of claim 28, wherein the interleaving of the first interleaved data comprises:

generating the second interleaved data in order of a first sector of the first error correction block, a last sector of the second error correction block, a second sector of the first error correction block, a second to last sector of the second error correction block, and continuously alternating inserting a next sector of the first error correction block and then a previous sector of the second error correction block until all the sectors of the first and second error correction blocks have been processed.

30. The interleaving method of claim 27, wherein each error correction block has a plurality of sectors, the interleaving of the first interleaved data comprising interleaving the sectors of a first one of the error correction blocks with the sectors of an adjacent second one of the error correction blocks.

31. The interleaving method of claim 30, wherein each sector has a first row with position information, and the interleaving of the first interleaved data comprises not interleaving the rows of the sectors of the first and second blocks, and interleaving remaining portions of the sectors other than the rows having the position information.

32. The interleaving method of claim 31, wherein the interleaving of the first interleaved data comprises:

generating the second interleaved data by placing the rows of the sectors of the first error correction block having the corresponding position information, and then the rows of the sectors of the second error correction block having the corresponding position information, and alternating sectors from the first and second error correction blocks other than the rows having the corresponding position information between the rows of the sectors of the first and second error correction blocks having the corresponding position information.

33. The interleaving method of claim 31, wherein the interleaving of the first interleaved data comprises:

generating the second interleaved data by placing the rows of the sectors of the first error correction block having the corresponding position information, and then the rows of the sectors of the second error correction block having the corresponding position information, and alternating half sectors from the first and second error correction blocks other than the rows having the corresponding position information added together between the rows of the sectors of the first and second error correction blocks having the corresponding position information.

34. An interleaving method of improving error correction capability of received data which form error correction blocks and corresponding to a recording medium having a higher density than a DVD recording medium, the method comprising:

interleaving the received data from at least two of the error correction blocks, to generate interleaved data compatibly correctable using an error correction code of the DVD recording medium format.

35. An interleaving circuit for improving error correction capability of received data which form error correction blocks and corresponding to a recording medium, the interleaving circuit comprising:

an intrablock interleaver which interleaves the received data having a predetermined correction code within each error correction block, to generate first interleaved data; and an interblock interleaver which interleaves the first interleaved data of at least two of the error correction blocks, to generate second interleaved data.

\* \* \* \* \*